United States Patent
Tardif

(10) Patent No.: US 12,204,941 B2
(45) Date of Patent: Jan. 21, 2025

(54) PRESERVING QUALITY OF SERVICE FOR CLIENT APPLICATIONS HAVING WORKLOADS FOR EXECUTION BY A COMPUTE CORE OR A HARDWARE ACCELERATOR

(71) Applicant: Microsoft Technology Licensing, LLC, Redmond, WA (US)

(72) Inventor: John Allen Tardif, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 21 days.

(21) Appl. No.: 18/324,693

(22) Filed: May 26, 2023

(65) Prior Publication Data

US 2024/0394104 A1    Nov. 28, 2024

(51) Int. Cl.
*G06F 9/48*    (2006.01)
*G06F 9/50*    (2006.01)
*G06F 9/54*    (2006.01)

(52) U.S. Cl.
CPC .......... *G06F 9/5027* (2013.01); *G06F 9/4881* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 2009/0002379 A1* | 1/2009 | Baeza | G06T 1/20 345/522 |
| 2018/0356964 A1* | 12/2018 | Morris | G06F 3/011 |
| 2019/0065401 A1* | 2/2019 | Dormitzer | G06F 11/3409 |
| 2019/0317802 A1 | 10/2019 | Bachmutsky et al. | |
| 2020/0004703 A1 | 1/2020 | Sankaran et al. | |

OTHER PUBLICATIONS

"Intel Data Streaming Accelerator Architecture Specification", Retrieved From: https://cdrdv2-public.intel.com/671116/341204-intel-data-streaming-accelerator-spec.pdf, Sep. 2022, 253 Pages.

(Continued)

*Primary Examiner* — Michael Sun
(74) *Attorney, Agent, or Firm* — Ranjeev Singh; Singh Law, PLLC

(57) ABSTRACT

Systems and methods for preserving the quality of service for client applications having workloads for execution by a compute core or a hardware accelerator are described. A method for operating a hardware accelerator configured to process commands submitted by client applications to the hardware accelerator, where a workload can be executed either by a compute core or by the hardware accelerator, is described. The method includes queueing commands for execution of workloads in a first set of command queues and queueing commands for execution of workloads in a second set of command queues. The method includes workload processors executing workloads specified by commands in the first set of command queues and the second set of command queues in an order of execution that is determined based on output of a set of trackers configured to track one or more criteria for a selected set of command queues.

20 Claims, 8 Drawing Sheets

(56) References Cited

OTHER PUBLICATIONS

Ballard, et al., "SNIA Standard: Smart Data Accelerator Interface (SDXI) Specification v1.0", Retrieved From: https://www.snia.org/sites/default/files/technical-work/sdxi/release/SNIA-SDXI-Specification-v1.0.pdf, Nov. 28, 2022, 144 Pages.

Kakaiya, et al., "Scalable I/O Between Accelerators and Host Processors", Retrieved From: https://www.intel.com/content/www/us/en/developer/articles/technical/scalable-io-between-accelerators-host-processors.html, Feb. 16, 2022, 8 Pages.

International Search Report and Written Opinion received for PCT Application No. PCT/US2024/030138, Oct. 2, 2024, 17 pages.

* cited by examiner

PRESERVING QUALITY OF SERVICE FOR CLIENT APPLICATIONS HAVING WORKLOADS FOR EXECUTION BY A COMPUTE CORE OR A HARDWARE ACCELERATOR

BACKGROUND

Client applications can be run in virtual environments hosted by servers or other computers. As an example, resources including compute cores, memory, and input/output (IO) resources are allocated to the virtual machines, allowing them to execute client applications using one or more compute cores associated with the respective server. Certain workloads, while being able to run on the allocated compute cores, are inefficient for execution by the compute cores due to the compute core architecture and/or the nature of the algorithms used in these workloads. Examples of these workloads include fills, copies, cyclic redundancy check (CRC) generation, compression, decompression, encryption, decryption, etc.

Certain computing environments include hardware accelerators that can execute these workloads more efficiently. While the workloads can be executed more efficiently using the hardware accelerators, priority mechanisms for granting access to the hardware accelerators can lead to noisy neighbor problems, including potential starvation of certain clients. To address such issues, some priority mechanisms use tokens that are assigned to the clients. However, such token mechanisms are usually not able to reallocate tokens based on utilization rates of clients. As an example, tokens may be assigned to client applications that will never use them for the window of time they are being assigned for. In addition, such token mechanisms are not able to tolerate the variability in the level of the system activity (e.g., memory traffic, fabric traffic, resulting in more tokens needed to hide transaction latencies, etc.). Standard traffic mechanisms typically use a window of time and expectation of traffic to track the traffic, which is susceptible to artificial limitations if there is traffic variability (e.g., variability in duty cycles) due to alignment of the traffic with the sampling windows. Thus, there is a need for improved methods and systems for preserving the quality of service for client applications using hardware accelerators.

SUMMARY

One aspect of the present disclosure relates to a method for operating a hardware accelerator configured to process commands submitted by client applications directly to the hardware accelerator, where a workload corresponding to a command can be executed either by a compute core accessible to a client application or by the hardware accelerator. The method may include queueing commands for execution of workloads in a first set of command queues.

The method may further include queueing commands for execution of workloads in a second set of command queues. The method may further include workload processors associated with the hardware accelerator executing workloads specified by the commands in the first set of command queues and the second set of command queues in an order of execution that is determined based on output of a set of trackers configured to track one or more criteria for a selected set of command queues from among the first set of command queues and the second set of command queues.

In yet another aspect, the present disclosure relates to a system including an accelerator portal to allow a plurality of client applications access to one or more of a plurality of shared hardware accelerators, where each of the plurality of client applications can execute a workload using a compute core or by using one of the plurality of shared hardware accelerators. The system may further include a hardware accelerator, from among the plurality of shared hardware accelerators, configured to queue commands for execution of workloads in a first set of command queues.

The hardware accelerator is further configured to queue commands for execution of workloads in a second set of command queues. The system may further include workload processors, associated with the hardware accelerator, configured to execute workloads specified by the commands in the first set of command queues and the second set of command queues in an order of execution that is determined based on output of a set of trackers configured to track one or more criteria for a selected set of command queues from among the first set of command queues and the second set of command queues.

In another aspect, the present disclosure relates to a method for operating a hardware accelerator configured to process commands submitted by client applications directly to the hardware accelerator, where a workload corresponding to a command can be executed either by a compute core accessible to a client application or by the hardware accelerator. The method may include queueing commands for execution of workloads in a first set of command queues, where each of the first set of command queues is associated with one of a set of virtual functions for a physical function associated with the hardware accelerator, and wherein a first set of trackers, configured to track one or more a first set of criteria for a first selected set of command queues from among the first set of command queues, is assigned by a virtual machine for a first stage of arbitration.

The method may further include queueing commands for execution of workloads in a second set of command queues, where a first subset of the second set of command queues is associated with the set of virtual functions for the physical function, where a second set of trackers, configured to track one or more of a second set of criteria for a second selected set of command queues from among the second set of command queues, is assigned by a system agent for a second stage of arbitration.

The method may further include workload processors associated with the hardware accelerator executing workloads specified by the commands in the first set of command queues and the second set of command queues in an order of execution that is determined based on tracking by a subset of the first set of trackers and the second set of trackers.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The present disclosure is illustrated by way of example and is not limited by the accompanying figures, in which like references indicate similar elements. Elements in the figures are illustrated for simplicity and clarity and have not necessarily been drawn to scale.

DETAILED DESCRIPTION

Figure 1:
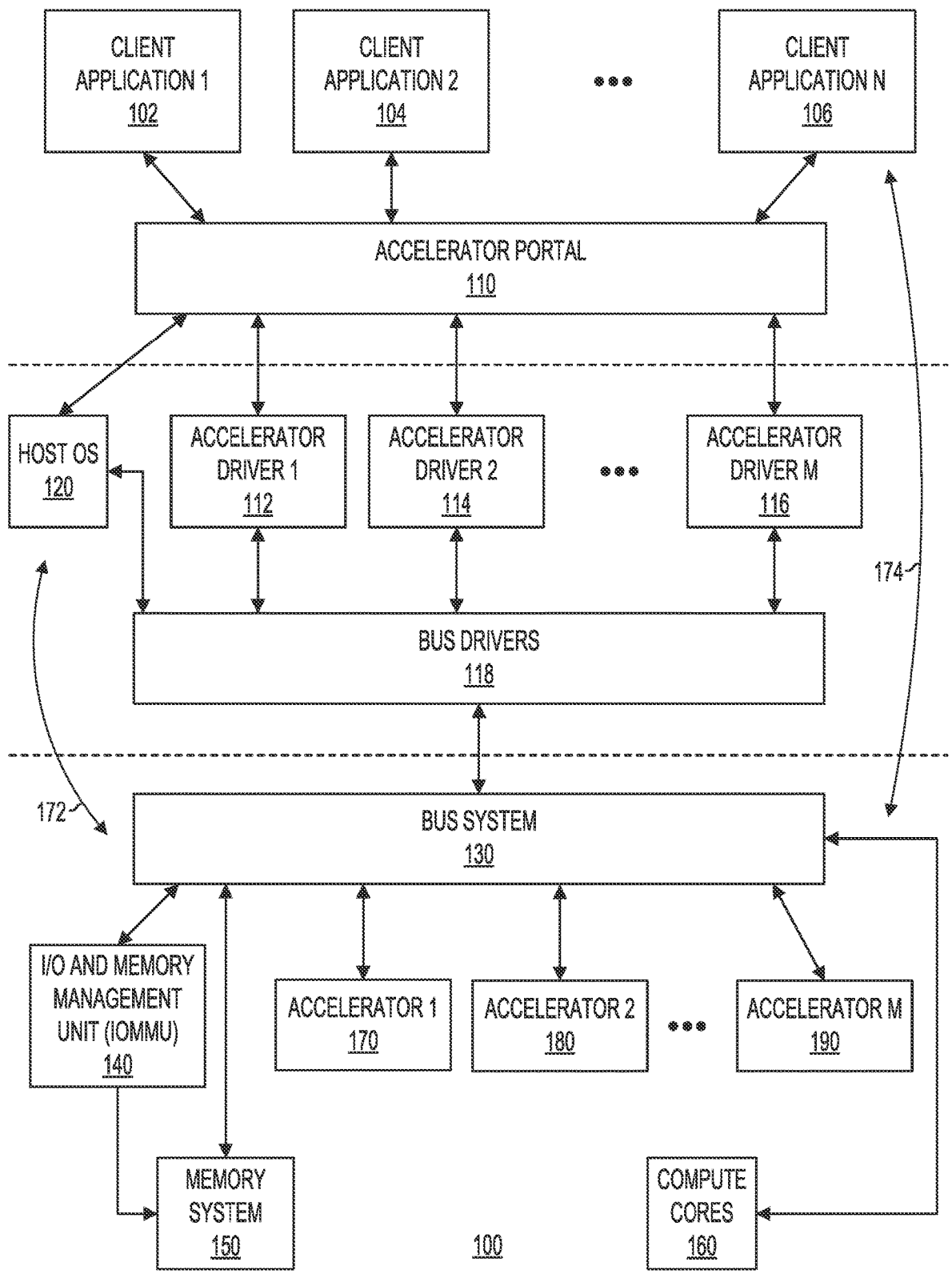
FIG. 1 shows a block diagram of a system for preserving the quality of service for client applications that are using hardware accelerators in accordance with one example.

Examples described in this disclosure relate to methods and systems for preserving the quality of service for client applications having workloads for execution by a compute core or a hardware accelerator. In certain examples, the methods and systems described herein may be deployed in any virtualized environment, including a single computer (e.g., a single server) or a cluster of computers (e.g., a cluster of servers). In certain examples, the methods and systems described herein may be deployed in cloud computing environments for performance expectation based selective execution of workloads using compute cores or hardware accelerators. Cloud computing may refer to a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly. A cloud computing model can be composed of various characteristics such as, for example, on-demand self-service, broad network access, resource pooling, rapid elasticity, measured service, and so forth. A cloud computing model may be used to expose various service models, such as, for example, Hardware as a Service ("HaaS"), Software as a Service ("SaaS"), Platform as a Service ("PaaS"), and Infrastructure as a Service ("IaaS"). A cloud computing model can also be deployed using different deployment models such as private cloud, community cloud, public cloud, hybrid cloud, and so forth.

In a virtualized computing environment, client applications are run using virtual machines (or other such virtual environments) hosted by servers. As an example, resources including compute cores, memory, and input/output (IO) resources are allocated to the virtual machines, allowing them to execute client applications using one or more compute cores associated with the respective server(s). Certain workloads, while being able to run on the allocated compute cores, are inefficient for execution by the compute cores due to the compute core architecture and/or the nature of the algorithms used in these workloads. Examples of these workloads include fills, copies, cyclic redundancy check (CRC) generation, compression, decompression, encryption, decryption, etc.

Certain computing environments include hardware accelerators that can execute these workloads more efficiently. While the workloads can be executed more efficiently using the hardware accelerators, priority mechanisms for granting access to the hardware accelerators can lead to noisy neighbor problems, including potential starvation of certain clients. In a virtual computing environment where many client applications may be submitting workloads for execution by hardware accelerators even a round robin mechanism for executing workloads can become a problem. This is because some client applications may submit large workloads tying up the hardware accelerator's resources.

To address such issues, some priority mechanisms use tokens that are assigned to the clients. However, such token mechanisms are usually not able to reallocate tokens based on utilization rates of clients. As an example, tokens may be assigned to client applications that will never use them for the window of time they are being assigned for. In addition, such token mechanisms are not able to tolerate the variability in the level of the system activity (e.g., memory traffic, fabric traffic, resulting in more tokens needed to hide transaction latencies, etc.). Standard traffic mechanisms typically use a window of time and expectation of traffic to track the traffic, which is susceptible to artificial limitations if there is traffic variability (e.g., variability in duty cycles) due to alignment of the traffic with the sampling windows.

FIG. 1 shows a block diagram of a system 100 for preserving the quality of service for client applications that are using hardware accelerators in accordance with one example. System 100 has example components associated with a virtualized execution environment that includes components for the user space, the kernel space, and the hardware. System 100 allows client applications (e.g., client application 1 (CA1) 102, client application 2 (CA2) 104, and client application N (CAN) 106) to access an accelerator portal 110 and submit workloads directly to the hardware accelerators supported by accelerator portal 110. Accelerator portal 110 is part of the user space allowing access to the client applications, including access to the virtual functions associated with physical functions for the hardware accelerators.

As part of kernel space, system 100 further includes accelerator drivers that are coupled to accelerator portal 110. System 100 may include one or more such accelerator drivers, which correspond to respective hardware accelerators included as part of system 100. In this example, system 100 includes accelerator driver 1 112, accelerator driver 2 114, and accelerator driver M 116. System 100 further includes bus drivers 118 that include software drivers corresponding to various bus types, including Peripheral Component Express (PCIe), Compute Express Link (CXL), Arm Microcontroller Bus Architecture (AMBA), or other bus types. System 100 further includes host operating system (OS) 120, which can communicate with the various components of system 100, including accelerator portal 110 and bus drivers 118. Host OS 120 may be any operating system that can support a virtualized environment. In some examples, the functionality associated with host OS 120 may be shared or included as part of a hypervisor (not shown).

With continued reference to FIG. 1, as part of hardware, system 100 includes bus system 130. Bus system 130 may be a PCIe bus system, CXL bus system, or another type of bus system. Bus system 130 is coupled to an input/output (IO) and memory management unit (IOMMU) 140. Bus system 130 is further coupled with memory system 150, which may further be coupled with IOMMU 140. Memory system 150 may include caches (L1, L2, and/or other system level caches), SRAM, and/or DRAM. IOMMU 140 may provide address translation services, allowing client applications and others to access memory. Memory access may be organized in the form of pages, blocks, or other forms.

Still referring to FIG. 1, bus system 130 is further coupled with compute cores 160. Compute cores 160 may correspond to servers or other computing resources accessible to the client applications. As explained earlier, in a virtualized environment, the compute cores may be shared among many client applications based on the subscriptions by respective client applications to the compute cores. Bus system 130 is further coupled with the hardware accelerators that perform certain workloads that can be offloaded by the client applications to the hardware accelerators. In this example, hardware accelerators include accelerator 1 170, accelerator 2 180, and accelerator M 190. Example hardware accelerators may include the direct streaming accelerator (DSA) from Intel, the quick-assist technology (QAT) accelerator from Intel, the Intel analytics accelerator (IAX), or any other suitable hardware accelerators. Offloaded workloads may include fills, copies, cyclic redundancy check (CRC) generation, compression, decompression, encryption, decryption, etc. In addition, offloaded workloads may be a sequence comprising at least two of aforementioned workloads. As an example, the sequence may include commands directed to any of the workloads described earlier. An example sequence may include the following commands: (1) decrypt, (2) decompress, (3) perform CRC check, (4) compress, (5) encrypt, (6) decrypt, (7) decompress, and (8) perform CRC check. This example sequence relates to recompressing and encrypting data that has been previously encrypted with a different key and compressed using a different codec. Other sequences may also be used.

In terms of the operation of system 100, client applications (e.g., client application 1 (CA1) 102, client application 2 (CA2) 104, and client application N (CAN) 106) can access any hardware acceleration functionality that is offered to them via accelerator portal 110. Any suitable system agent (e.g., the host OS 120 or a hypervisor) is configured to assign virtual functions for a given hardware accelerator to a virtual machine or a similar entity. This allows the client applications the ability to access the virtual functions corresponding to a physical function, which in turn corresponds to a hardware accelerator. Each virtual function may only be assigned to a single virtual machine (or another type of guest OS or a container) at a time, since virtual functions require real hardware resources associated with a hardware accelerator. A virtual machine can be assigned multiple virtual functions. Virtual functions are derived from physical functions, which may be full PCI Express (PCIe) devices or another type of device. As an example, one or more PCIe devices can be configured per the single-root input/output virtualization (SR-IOV) specification to offer virtual functions corresponding to physical functions. Other abstractions associated with hardware accelerators besides the abstractions of virtual functions and physical functions may also be offered by accelerator portal 110. A system agent (e.g., the host OS 120 or a hypervisor) can configure the specifics for each such assignment, which may relate to the quality of service, the prioritization methodology, the performance in terms of minimum guarantees etc.

Once a virtual function is assigned, the client applications can submit workloads directly to the hardware accelerator having a corresponding physical function that is supported by accelerator portal 110. In system 100, accelerator portal 110 is part of the user space allowing access to the client applications, including access to the virtual functions associated with physical functions for the hardware accelerators. As an example, the client applications executing in the user space can directly submit offloaded workloads to the hardware accelerators via data path 174. Similarly, host OS 120 can directly submit offloaded workloads to the hardware accelerators via data path 172. In one example, the workloads may be submitted using commands that can perform memory mapped I/O operations directly on the hardware accelerators. In other words, the client applications need not rely on interrupts or calls to a driver stack in order to submit the workloads to the hardware accelerators. Moreover, the client applications need not context switch out from the context associated with the compute cores being used to execute the client application at a given time. Advantageously, this arrangement lowers the cost of entry for offloading workloads to the hardware accelerators by reducing the latencies associated with submitting workloads to the accelerators and getting completions back.

Commands may be submitted by client applications via data path 174. Both posted write commands and non-posted write commands may be used. Posted write commands do not require an acknowledgement indicating that the command was received and has been queued. Instead, the acknowledgement is sent only when the workload processing requested by the posted write command has been completed. Non-posted write commands allow a response back. The response may be a retry response. The retry response may include additional information, including for example, how busy the hardware accelerator is. As used herein the term "retry response" refers to any type of response that allows the client application to determine whether to execute the workload using a compute core accessible to the client application or let the already submitted command for the workload to be executed by the hardware accelerator. Other commands, including commands that allow atomic command submissions may also be used by the client applications to request workload processing by the hardware accelerators in the system. Although FIG. 1 shows system 100 including a certain number of components, arranged in a certain manner, system 100 may include additional or fewer components arranged differently. As an example, system 100 may include additional or fewer hardware accelerators. As another example, memory management and I/O management tasks may be performed by different components other than integrated components, such as IOMMU 140 of FIG. 1. As another example, although FIG. 1 describes a virtual computing environment with multiple client applications and multiple hardware accelerators, the methods associated with the disclosure herein may be executed even in a scenario where there is only one hardware accelerator and only one queue for the physical function associated with the hardware accelerator.

Figure 2:
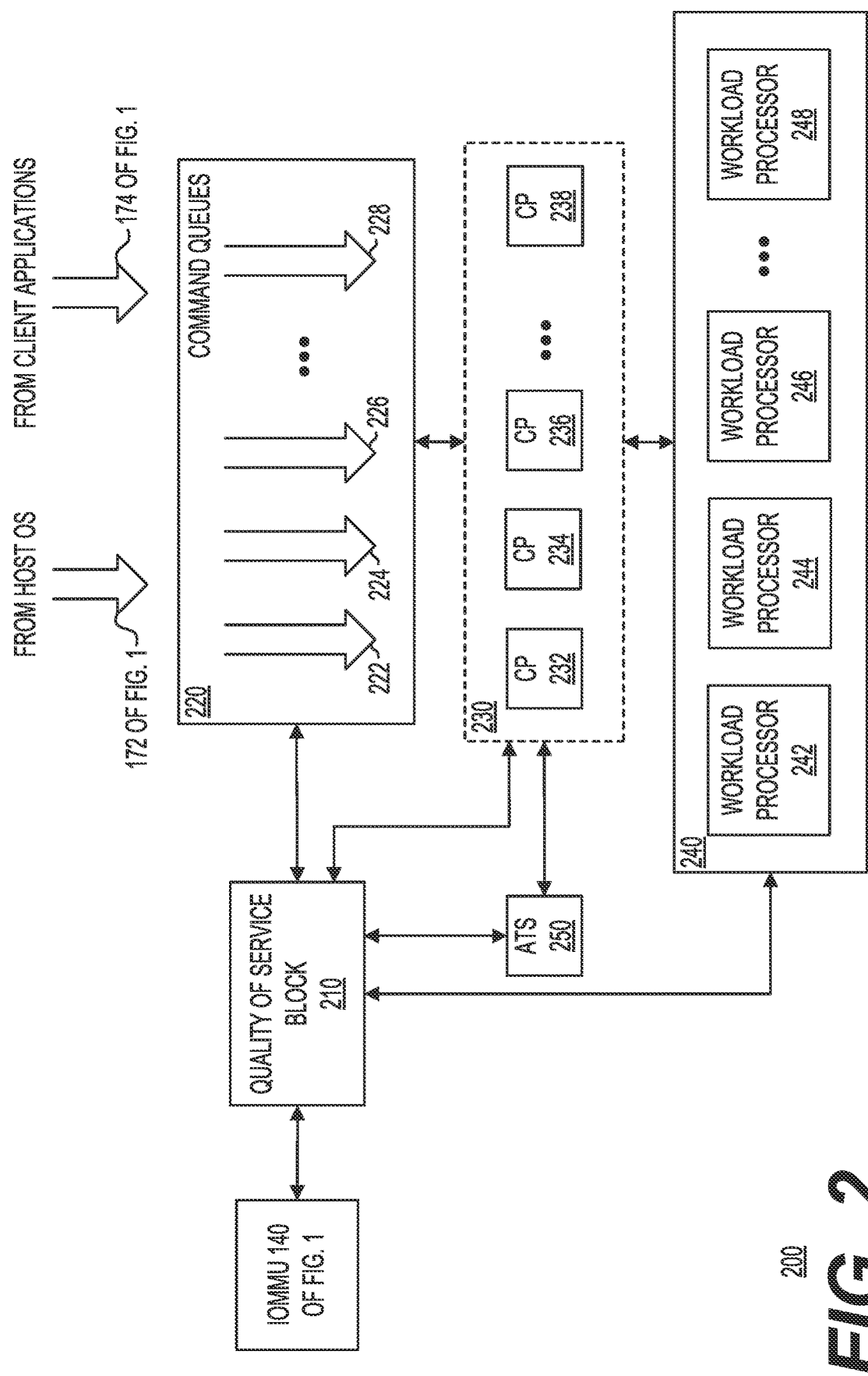
FIG. 2 shows a block diagram of an example hardware acceleration system for use with the system of FIG. 1.

FIG. 2 shows a block diagram of an example hardware acceleration system (HAS) 200 for use with the system 100 of FIG. 1. HAS 200 includes a quality of service block 210 coupled with command queues 220. Quality of service block 210 is further coupled with IOMMU 140 of FIG. 1. In addition, quality of service block 210 is coupled with a block of workload processors 240, which may correspond to workload processors for any one of the hardware accelerators described earlier with respect to FIG. 1. Each hardware accelerator may have a dedicated quality of service block or such blocks may be shared among the hardware accelerators. Command queues 220 may receive commands from client applications of FIG. 1 via data path 174 of FIG. 1. Command queues 220 may also receive commands from host OS 120 of FIG. 1 via data path 172. In one example, command queues 220 may be implemented using first-in-first-out (FIFO) buffers. Command queues 220 may include shared queues for a particular hardware accelerator. Some of the command queues may be dedicated queues for a hardware accelerator. Some command queues may be configured to process high priority workloads, whereas some other command queues may be configured to process regular priority workloads. Certain command queues may be intended for larger workloads (e.g., a 4 GB workload) and some of the command queues may be intended for smaller workloads (e.g., a 4 KB workload). Any of the client applications may call a library function (e.g., offered via accelerator portal 110 of FIG. 1) to determine a size of the workload and decide whether to offload the workload. The size information may also be used to ensure that the commands corresponding to the workloads are queued in the right queue. This arrangement may help reduce the completion latency associated with the workloads. As an example, quality of service block 210 ensures that the queues with smaller workloads are monitored (e.g., using a watchdog timer) or otherwise assigned higher priorities to allow for their completion.

Command queues may also be configured such that there are no command queues that are shared among different types of accelerators. As an example, a compressor accelerator may not share any command queues with a decryption accelerator. Accumulators associated with each command queue may include the size of a respective command queue. As commands are submitted for execution, the accumulator may be decremented. As additional commands arrive, the accumulator may be incremented. At any given time, the accumulator for each command queue will have a running count of the number of commands still in the command queue.

As explained earlier, client applications can access the virtual functions corresponding to a physical function, which in turn corresponds to a hardware accelerator. In one example, HAS 200 supports input command queues that are provided command descriptors using atomic 64 B writes. Each command queue operates as an independent FIFO for the command descriptors within it. In one example, each hardware accelerator is assumed to have one physical function per device, up to 32 virtual functions per device, up to four command queues per PF/VF, and up to 4000 queue entries per device. Indeed, a different number of physical functions/virtual functions may be configured per device. Each PF, VF, and queue can be identified by a unique identifier. Although not shown in FIG. 2, a device driver can partition resources according to the VF, and a function driver can partition resources for the queues that each VF wants to support. Thus, the device driver can set up and configure a respective hardware accelerator as a whole and a function driver can handle the configuration and attributes and quality of service settings for a given VF portal. As an example, the device driver can allocate the base and total number of entries per PV/VF for the command queue memory. The device driver can also allocate the number of command queue tracking resources per VF that are available. The function driver can read configuration registers to determine its allocation of queue trackers and queue memory. The function driver can also program the number of command queues it wants to use and to allocate the base and size for each queue in its allocated command queue memory space.

HAS 200 further includes a block of command processors 230. In this example, the block of command processors 230 includes command processor (CP) 232, CP 234, CP 236, and CP 238. HAS 200 further includes a block of workload processors 240. In this example, the block of workload processors 240 includes workload processor (WP) 242, WP 244, WP 246, and WP 248. HAS 200 further includes an address translation service 250. Any of the command processors can access address translation services (ATS) 250 and any of the workload processors in the block of workload processors 240. Thus, any of the command processors initiates the translation of virtual addresses to physical addresses, obtains such translations, and then calls any of the workload processors for the performance of the workload. In one example, each workload has a size of 4 kilobytes (KB). The workload size may be selected to have the same granularity as the one supported by the host OS for address translation purposes. Each workload processor can be viewed as having at least the functionality associated with a DMA engine, in that it can independently initiate memory reads, perform the acceleration function (if it requires more than just copying or moving), and then perform memory writes, as required. Workload processors are assigned to process a workload after an arbitration process is completed. Although FIG. 2 shows HAS 200 including a certain number of components, arranged in a certain manner, HAS 200 may include additional or fewer components arranged differently. As an example, HAS 200 may include additional or fewer command queues, additional or fewer command processors, and additional or fewer workload processors. As another example, memory management and I/O management tasks may be performed by different components other than integrated components, such as IOMMU 140 of FIG. 1.

In one example, HAS 200 implements quality of service and arbitration mechanisms that ensure one or more of the principles shown in Table 1.

TABLE 1

No workload from a command from one queue can hold up the workload from another queue. (As an example, a 4KB workload with higher priority cannot be stuck behind ongoing lower priority 4GB workloads in other queues).
Ability to set QoS allocations independently per PF/VF. This could support different performance levels for clients' needs versus systems' needs.
Ability for each PF/VF to allot QoS allocations independently per queue. This could support high priority, small commands having much lower latency than lesser priority, large commands.
Ability to specify minimum aggregate performance per VF and per queue. These minimums are usually expressed in terms of throughput (e.g., N MB/s) but can also be in relative terms (e.g., make sure a queue has at least N % of total BW).
Ability to allocate maximum BW (read and/or write) per VF. Maximum can be in absolute terms (e.g., MB/s) or in relative terms (e.g., N % of available).
Ability to allocate priorities per VF and/or per queue. Higher priorities are given to those queues that are falling behind their minimums. Lower TABLE 1-continued priorities are given to those queues that have met their maximums.
Ability to have a hard limit for the maximum budget, OR allow unused resources to be distributed to those VFs that have met/exceeded their maximum budget.
Allow workload bursting for QoS. (e.g., allow specifying equivalent of workload and timebase for consideration).
Ability to slow down VFs that are resulting in too much address translation service (ATS) traffic. This can be in absolute terms (e.g., transactions/sec) or in relative terms (e.g., N % of available). An example is a client that is thrashing the shared address translation service.

Consistent with the examples described herein, the principles stated above in Table 1 are realized by a combination of two stage arbitration and real time tracking of at least one of the absolute performance or relative performance. Quality of service block 210 includes trackers for tracking such performance and other quality of service criteria. For each client application and each command queue, there are separate and independent trackers for performance tracking. Thus, a tracker can be configured to track an absolute performance (e.g., N megabytes (MB)/second) of bandwidth of a transaction bus associated with accelerators or a relative performance (e.g., percentage of the bandwidth). Broadly speaking, a tracker has an input signal that will be high for every clock (or a certain number of clocks) that a condition being tracked occurs. For minimum performance, that condition could be when a workload unit is performed. For maximum performance (e.g., maximum bandwidth), that condition could be a write or read data strobe. The tracker has another input signal that will be high for every clock (or a certain number of clocks) whenever the condition being tracked against occurs. For absolute performance, this input signal is either always 1 when counting system clocks, or a pulse train that tracks a divided down version of that clock. For relative performance, this input signal can be whenever any transaction occurs, not just the ones that are being tracked.

Every time the condition being tracked occurs, a programmed value is used to increment the tracking level. Every time the condition not being tracked against occurs (for relative tracking) or a coarse clock quanta transpires (for absolute tracking), another programmed value is used to decrement the tracking level. If the items being tracked are occurring at the desired rate, the tracker level will remain at the same level. If the items being tracked are occurring at a rate higher than the desired rate, then the tracker level will rise. If the items being tracked are occurring at a rate lower than the desired rate, then the tracker level will fall. Clamping can be used to avoid overflow and underflow conditions for these increment/decrement operations. In addition, the trackers support programmable duty cycle asymmetry (indicative of the burstiness of work), excursion tracking (indicative of how far off the specified rate is tracked), and assertion levels (indicative of at what point does one raise the alarm about being off the specified rate).

The same tracker design can be used for tracking the minimum rates or the maximum rates. An input strap can be used to select between the two modes of operation. The tracker has an output signal indicating whether the tracker level has fallen below the minimum level (when configured to track the minimum rate) or has risen above the maximum level (when configured to track the maximum rate). This level is determined by a configuration register. As an example, a 16-bit value for this level and tracker precision can be used. Upon a reset, the trackers can be reset to midrange or can be set to a programmed level. The total dynamic range of the tracker level is determined by the tracker level precision and the increment/decrement levels. The longer the time period over which one wants to average out the performance, the smaller the increment levels should be to support a larger dynamic range before clamping.

Figure 3:
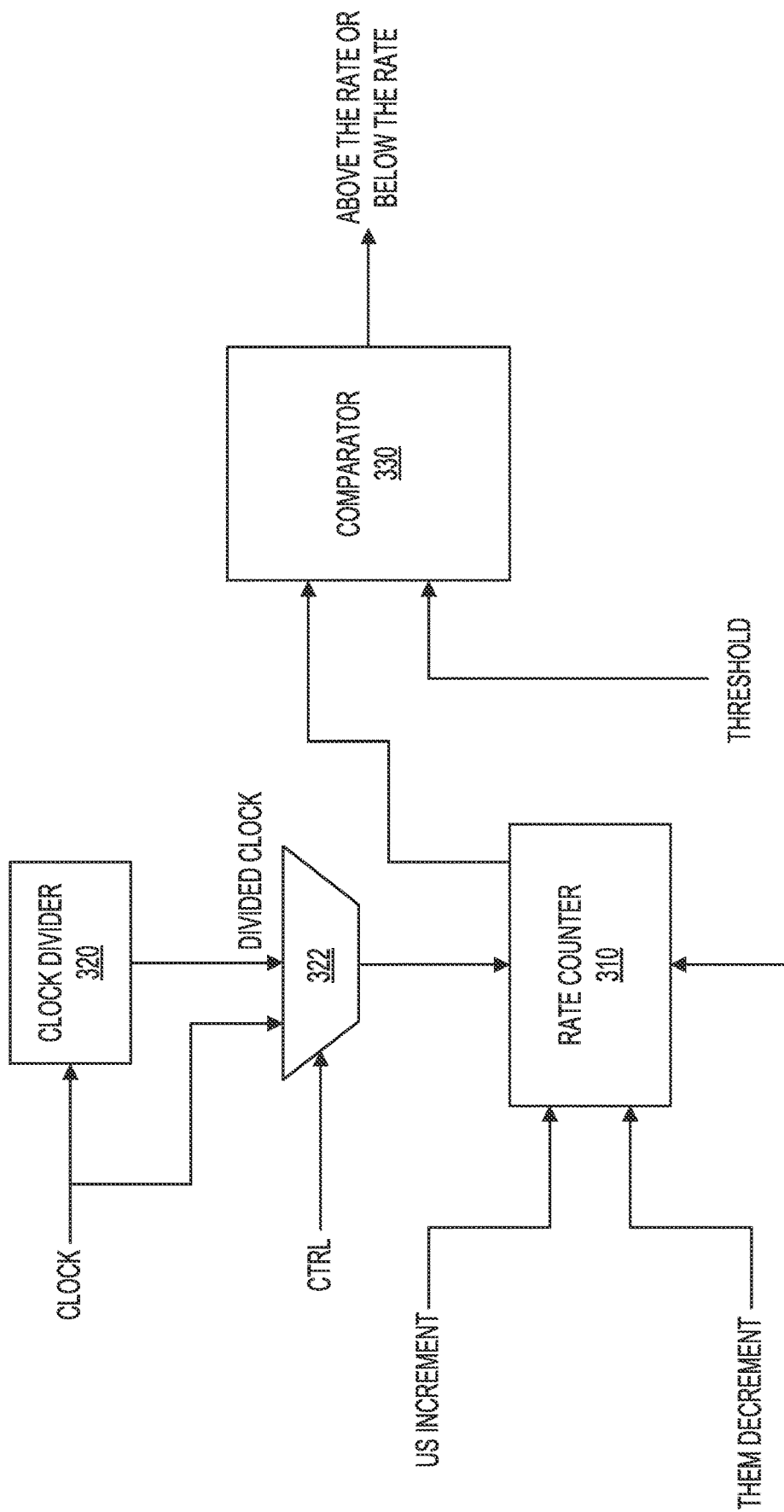
FIG. 3 shows an example tracker for use with the hardware acceleration system of FIG. 2.

FIG. 3 shows an example tracker 300 for use with the hardware acceleration system (HAS) 200 of FIG. 1. In this example, tracker 300 includes a rate counter 310, a clock divider 320, and a comparator 330. Rate counter 310 may be a 16 bit counter that can be reset to a value that is the same as the threshold value. Configuration registers (not shown) can be used to store those values for the tracker 300 that can be programmed depending on the tracker's purpose in terms of what conditions are being tracked (e.g., conditions based on bus transactions, address translation service related transactions, memory usage, or some other aspect).

The data related to the conditions being tracked may also be obtained from the specific resource monitoring corresponding to the architecture associated with the compute cores. As an example, compute cores may be ARM cores or x86 compatible cores. If the compute cores are ARM cores, then ARM architecture additions related to resource monitoring, such as memory partitioning and monitoring (MPAM), may provide the data related to the conditions being tracked. As an example, MPAM may provide data related to the bandwidth consumption associated with the transactions on the bus (e.g., bus system 130 of FIG. 1). If the compute cores are x86 cores, then Intel architecture related aspects related to resource monitoring may provide the data related to the conditions being tracked. As an example, memory bandwidth monitoring (MBM) offered by Intel may be used to track data related to the bandwidth consumption associated with the transactions on the bus (e.g., bus system 130 of FIG. 1). Other more extensive resource monitoring hardware/software systems may be used to collect the data relevant to the conditions being tracked by each tracker (e.g., tracker 300).

The US INCREMENT signal corresponds to a signal indicating a condition that is being tracked as time is passing. The THEM DECREMENT signal corresponds to a clock signal (or a clock divider signal) if an absolute value is being tracked. Thus, if one is trying to hit a given rate of consumption of a resource and the increment and the decrement values have been configured to track the deviation from the given rate then the rate counter value stays about the same. Overtime, occasionally the rate counter value may increase and then decrease based on activity and time, but the general level will stay about the same. The specific values chosen for the increment and the decrement related signals define the dynamic range of tracker 300. As an example, if the tracker is being used to track the memory bandwidth, then one could increment rate counter 310 for every bus transaction (e.g., a 64 byte (64 B) transaction) or choose a different level of granularity. As an example, assuming the hardware accelerators are working on four kilobyte (4 KB) workloads, then rather than incrementing rate counter 310 for every bus transaction, rate counter 310 is incremented every single time a 4 KB worth of bus transactions have been completed.

The THEM DECREMENT signal may correspond to a clock signal (e.g., the clock signal CLOCK or a divided version of the clock signal DIVIDED CLOCK) indicating the passage of time. The THEM DECREMENT signal may also correspond to a signal that is for the same condition that is being tracked in a relative manner as the time is passing.

The output of rate counter 310 is compared against a threshold (e.g., THRESHOLD shown in FIG. 3) using comparator 330. If the tracker 300 is being used to track against the maximum usage, then the threshold value may be set as the maximum usage value configured for a resource (e.g., maximum bandwidth usage). The output of comparator 330 indicates whether the rate of usage is above the maximum rate or some other targeted rate (e.g. ABOVE THE RATE). On the other hand, if the tracker 300 is being used to track against the minimum usage, then the threshold value may be set as the minimum usage value configured for a resource (e.g., minimum bandwidth usage). The output of comparator 330 indicates whether the rate of usage is below the minimum rate or some other targeted rate (e.g. BELOW THE RATE). As an example, if tracker 300 is being used to track the performance of the address translation service, then the threshold value can be the value that represents how far off from the average the current level is at. Although FIG. 3 shows tracker 300 including a certain number of components, arranged in a certain manner, tracker 300 may include additional or fewer components arranged differently.

Tracked performance by trackers is used as part of the arbitration process for allocating access to resources and services. In accelerators, there are a few points where many client applications need to access a limited resource, like a single port memory, an interface, or a processing engine. For most of these occasions, round robin access is granted to the requestors wanting access to such limited resources. For better QoS support, there are other places in an accelerator where a more sophisticated mechanism for arbitration is needed. In this example, the arbitration mechanism needs to ensure the QoS principles outlined in Table 1 above. Unlike a credit system, unused resources are readily redistributed to reduce average overall latencies. The trackers are used to ensure that at least the minimum performance is achieved (provided that the system is not oversubscribed) and that clients cannot consume resources beyond their allocations.

In one example, there is a minimum performance tracker for each VF. The tracker counts 64 B quanta of work performed by all commands from all queues for a given VF. Work could entail only read operations (like for CRC generation), only write operations (like for fill), or both (like for copy). For a copy command, 64 B of data that is read and then written can be configured to represent one quanta of work or 2 quanta. If the combined performance of a VF falls below the minimum performance desired/programmed, then workloads under that VF have the option of being granted higher priority for getting work done. In this example, there is a minimum performance tracker for each queue within a VF. This tracker has the same function as the VF minimum tracker, but observes traffic from only that specified VF queue. Workloads that fall behind target have the option of being granted higher priority for getting work done.

In one example, there are two maximum bandwidth trackers, one for read operations and one for write operations. The trackers track 64 B quanta of payload for all commands from all queues for a given VF. Workloads that exceed either of their target BW allocations have the option of being granted lower priority for getting work done. However, if there are unutilized resources, workloads that have exceeded their quota have the option of still getting work done. Moreover, in this example, there are two maximum bandwidth trackers for each queue, one for read operations and one for write operations. The trackers track 64 B quanta of payload for all commands from that specified queue. Workloads that exceed either of their target BW allocations have the option of being granted lower priority for getting work done. However, if there are unutilized resources, workloads that have exceeded their quota have the option of still getting work done.

In addition, in this example, there is another set of trackers per VF and per queue which track the rate of address translation service (ATS) transactions used by given resources. Because ill-conditioned processes may use more than their fair share of ATS resources, the maximum ATS performance trackers support deprecating priority for those type of workloads getting access to the ATS resources.

Figure 4:
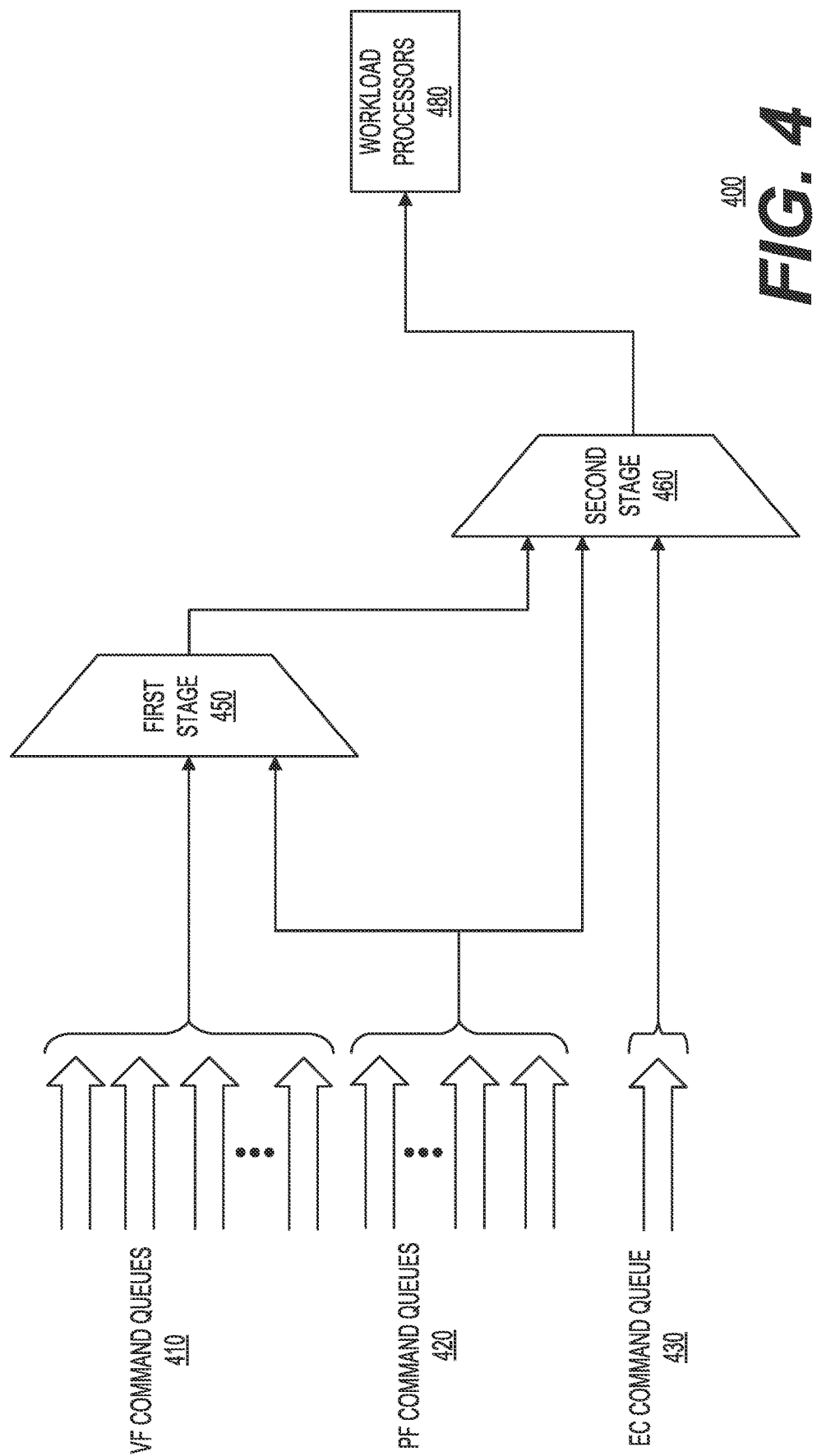
FIG. 4 shows a block diagram of a two-stage arbitration system for use with the hardware acceleration system of FIG. 2.

FIG. 4 shows a block diagram of a two-stage arbitration system 400 for use with HAS 200 of FIG. 2. Two-stage arbitration system 400 can be used to implement the two-stage arbitration aspects described earlier. Arbitration is performed in two stages. As explained earlier with respect to FIGS. 2 and 3, command queues are used for receiving command descriptors indicating the workload to be performed. In this example, command queues are divided into three categories: (1) virtual function (VF) command queues 410, (2) physical function (PF) command queues 420, and (3) embedded controller (EC) command queue 430. In one example, there may be 128 VF queues with four queues for each of the 32 VFs. In addition, in this example, there may be 16 queues for the PF and a single queue for the EC. Other numbers and arrangement of command queues may also be used.

With continued reference to FIG. 4, two-stage arbitration system 400 includes a first stage 450 and a second stage 460. Each stage includes control logic (e.g., finite state machines, control registers, and other digital logic), which can be initialized and configured using QoS control signals, which may be provided by quality of service block 210 of FIG. 2. The QoS control signals specify parameters associated with the quality of service, including the various criteria described earlier for each type of queue and the QoS principles described earlier with respect to Table 1. The first stage 450 determines which command in each function will be the next to go for that function. This is done for each function independently based on the queue level QoS parameters for each specific queue. In one example, the first stage of arbitration is for a specific client application, in that for the first stage the client application can configure the priority levels for the various queues that the client application has been given access to. A virtual machine offering the virtualized environment to the client application can configure the priority levels. Thus, at a given time, each client application may access only a subset of the command queues and can control the priority levels of the queues that are accessible to it. The second stage 460 determines which function will go next. For the first and second stages of arbitration, there are three priority levels to use for a given queue/function including: (1) one priority level is to be used when a queue/function minimum performance tracker indicates that the aggregate performance of all commands from a queue/function is falling behind a desired rate (usually assigned a higher priority number), (2) another priority level is to be used when a queue/function maximum performance tracker indicates that the queue/function performance is ahead of the maximum performance rate, and (3) yet another priority level is to be used if neither case is true.

For the second stage 460, the priority levels can be a different set from the priority levels used for the first stage 450. A priority level of zero can be programmed for the maximum performance tracker(s) if one absolutely does not want to exceed maximum allocations, even if unused resources are available. The minimum performance tracker takes precedence over the maximum performance tracker; and thus, if a command is falling behind performance, it will get the higher priority level, even when exceeding allocated resources.

As one example, for the first arbitration stage 450, the function driver can be configured with two 4-bit priority levels to use for a given queue (e.g., each one of VF command queues 410). One priority level is to be used when the minimum performance tracker for the queue indicates that the aggregate performance of all commands from the queue is falling behind a desired rate (usually assigned a higher priority number). Another priority level is to be used when the queue is ahead of the maximum performance rate. In this example, the physical function (PF) command queues 420 have no tracking since their priority levels are fixed. Since physical functions can have workloads with the highest and the lowest overall priorities, each PF command queue can have independent (and different) 4-bit priority values for the first and second stages of arbitration. Hence, in this example, eight bits are used per PF command queue priority level, four bits are used for first stage arbitration, and four bits are used for the second stage of arbitration. An embedded controller (EC) used with the hardware accelerator has only one queue (e.g., command queue 430) and thus the first stage of arbitration is not needed for this queue.

For the second stage 460, 4-bit priority levels are used, but they are configured in a different manner from the first stage 450. The device driver can configure three 4-bit priority levels to use for each VF command queue (e.g., any one of the VF command queues 410). One priority level is to be used when the minimum performance tracker for the VF command queue indicates that the aggregate performance of the VF command queue is falling behind a desired rate (usually assigned a higher priority number). Another priority level is to be used when the aggregate maximum bandwidth or the address translation service (ATS) trackers for the VF command queue indicate that the VF command queue has exceeded the allocated resource rates (usually assigned a lower number). Yet another priority level is to be used when the VF command queue is in between those conditions. A priority level of 0 should be programmed for the maximum tracker(s) if one absolutely does not want to exceed maximum allocations, even if unused resources are available. The minimum performance tracker takes precedence over the maximum performance tracker. Thus, if a command is falling behind performance, it will get the higher priority level, even if exceeding allocated resources.

Physical function (PF) commands have no tracking since in this example their priority levels are absolute assignments programmed via registers. Since PFs can have work with the highest and the lowest overall priorities, each queue for the PF can have a different 4-bit priority value for the first and second stages of arbitration. After the first stage of arbitration, the selected PF command queue has a second stage priority level, and that value is used for the second stage arbitration. Embedded controller commands have a priority assigned by a control register (not shown), which the embedded controller can change between commands submitted to its queue. The output of second arbitration stage 460 is provided to workload processors 480. Using the QoS control signals for the second arbitration stage 460, the order of execution of the workloads can be dynamically controlled since, instead of the workload processors executing workloads based on the first stage of arbitration, they can execute workloads in an order of execution based on the second stage of the arbitration. In addition, the QoS control signals for the second arbitration stage 460 cannot be dictated by individual client applications. This allows a system agent (e.g., host OS 120 of FIG. 1 or a hypervisor) to exercise control over noisy neighbor issues and ensure that such problems do not occur. This is because at this second arbitration stage, a decision is made as to which virtual function's queue is allowed to proceed in terms of command submissions to the workload processors 480. Workload processors 480 (e.g., similar to workload processors described with respect to FIG. 2) have the logic (e.g., finite state machines or other digital logic similar to a DMA engine) to read memory, perform the requested operation on the data (e.g., a fill or copy operation), including writing the data, as needed to another memory location.

Arbitration for the address translation service (ATS) resources should consider whether a given VF command queue has exceeded ATS resource allocations, but it does not necessarily need to consider whether the memory bandwidth allocations have been exceeded (even though the two are related). Similarly, arbitration for the workload processors (WPs) associated with an accelerator should consider whether the memory bandwidth allocations have been exceeded but does not necessarily have to consider whether the ATS allocations have been exceeded. This is because such accesses are inherently self-limiting (a workload processor cannot be arbitrated until necessary addresses have been translated, and a command processor is limited in how far it can prefetch work). Although FIG. 4 shows two-stage arbitration system 400 including a certain number of components, arranged in a certain manner, two-stage arbitration system 400 may include additional or fewer components arranged differently. As an example, two-stage arbitration system 400 may include additional arbitration stages and additional or fewer command queues.

Table 2 below shows one example of the order of execution of commands for an accelerator assuming there are only nine active commands for the accelerator. In this example, command #9 was submitted by the embedded controller (EC) and the priority level (4-bits) was set prior to the command submission. Since there is only one queue for the EC, the second stage does not need any arbitration. The virtual functions (VFs) were all assigned (during initialization) a priority level 4 if running within bounds, a priority level 0 if exceeding the maximum resource consumption rate, and a priority level 12 if running behind. For each VF, 4 queues were assigned, a priority level 11 if running behind, priority level 9 if running within bounds. For the physical function (PF), queue 1 was assigned a priority level 4 for the first stage of arbitration and priority level 13 for the second stage of arbitration. For the PF, queue 2 was assigned a priority level 5 for the first stage of arbitration and priority level 14 for the second stage of arbitration. The order of execution is shown in the right most column of Table 2 below.

TABLE 2

| Active | First Stage Queue | QMin Tracker | First Stage Priority | Stage Second | VFMin Tracker | VFMax Tracker | Second Stage Priority | Order of Execution |
|---|---|---|---|---|---|---|---|---|
| 1 | 0 | 1 | 11 | VF#1 | 0 | 0 | 4 | 5 |
| 2 | 1 | 0 | 9 | VF#1 | 0 | 0 | 4 | 7 |
| 3 | 2 | 0 | 9 | VF#7 | 0 | 0 | 4 | 8 |
| 4 | 0 | 1 | 11 | VF#7 | 0 | 0 | 4 | 6 |
| 5 | 2 | 0 | 9 | VF#23 | 1 | 0 | 12 | 3 |
| 6 | 3 | 1 | 11 | VF#30 | 0 | 1 | 0 | N/A |
| 7 | 1 | | 4 | PF | | | 13 | 2 |
| 8 | 2 | | 5 | PF | | | 14 | 1 |
| 9 | | | | EC | | | 8 | 4 |

The two stages of arbitration help reduce noisy neighbor problems while providing the ability to allocate QoS per queue as needed. Participation in the second stage of arbitration requires results from the first stage of arbitration for active command processors. For example, a client is enabled to arbitrate in the second stage only if at least one of its command processors has work to do. Moreover, an additional functionality can employ watchdog timers to increment priorities for commands that have been waiting longer for execution.

Figure 5:
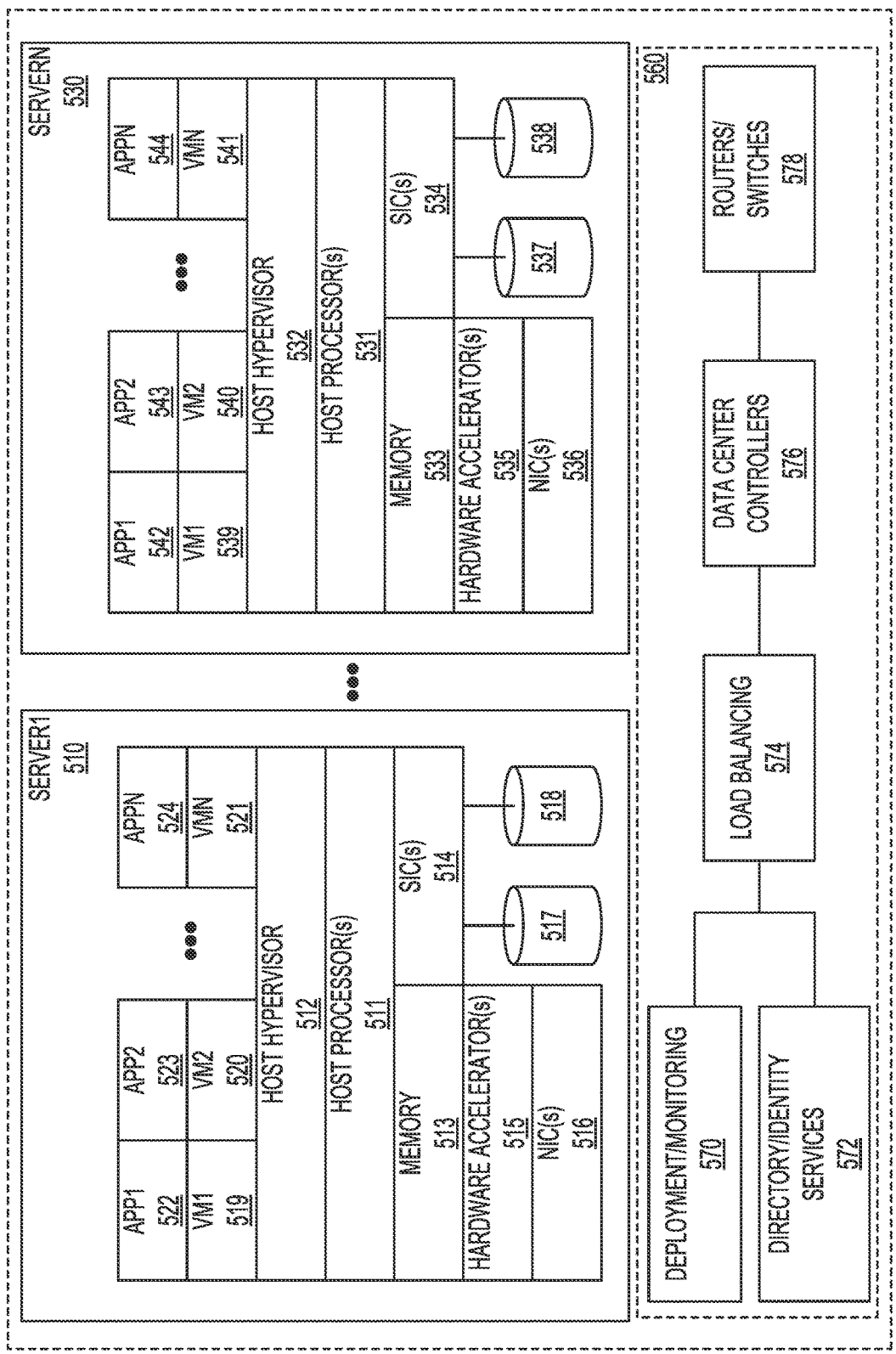
FIG. 5 shows a system environment for implementing a system for preserving the quality of service for client applications having workloads for execution by a compute core or a hardware accelerator in accordance with one example.

FIG. 5 shows a system environment 500 for implementing systems and methods in accordance with one example. In this example, system environment 500 may correspond to a portion of a data center. As an example, the data center may include several clusters of racks including platform hardware, such as server nodes, storage nodes, networking nodes, or other types of nodes. Server nodes may be connected to switches to form a network. The network may enable connections between each possible combination of switches. System environment 500 may include server1 510 and serverN 530. System environment 500 may further include data center related functionality 560, including deployment/monitoring 570, directory/identity services 572, load balancing 574, data center controllers 576 (e.g., software defined networking (SDN) controllers and other controllers), and routers/switches 578. Server1 510 may include host processor(s) 511, host hypervisor 512, memory 513, storage interface controller(s) (SIC(s)) 514, hardware accelerator(s) 515 (e.g., the accelerators described earlier), network interface controller(s) (NIC(s)) 516, and storage disks 517 and 518. ServerN 530 may include host processor(s) 531, host hypervisor 532, memory 533, storage interface controller(s) (SIC(s)) 534, hardware accelerator(s) 535 (e.g., the accelerators described earlier), network interface controller(s) (NIC(s)) 536, and storage disks 537 and 538. Server1 510 may be configured to support virtual machines, including VM1 519, VM2 520, and VMN 521. The virtual machines may further be configured to support applications, such as APP1 522, APP2 523, and APPN 524. ServerN 530 may be configured to support virtual machines, including VM1 539, VM2 540, and VMN 541. The virtual machines may further be configured to support applications, such as APP1 542, APP2 543, and APPN 544.

With continued reference to FIG. 5, in one example, system environment 500 may be enabled for multiple tenants using the Virtual extensible Local Area Network (VXLAN) framework. Each virtual machine (VM) may be allowed to communicate with VMs in the same VXLAN segment. Each VXLAN segment may be identified by a VXLAN Network Identifier (VNI). Although FIG. 5 shows system environment 500 as including a certain number of components arranged and coupled in a certain way, it may include fewer or additional components arranged and coupled differently.

Figure 6:
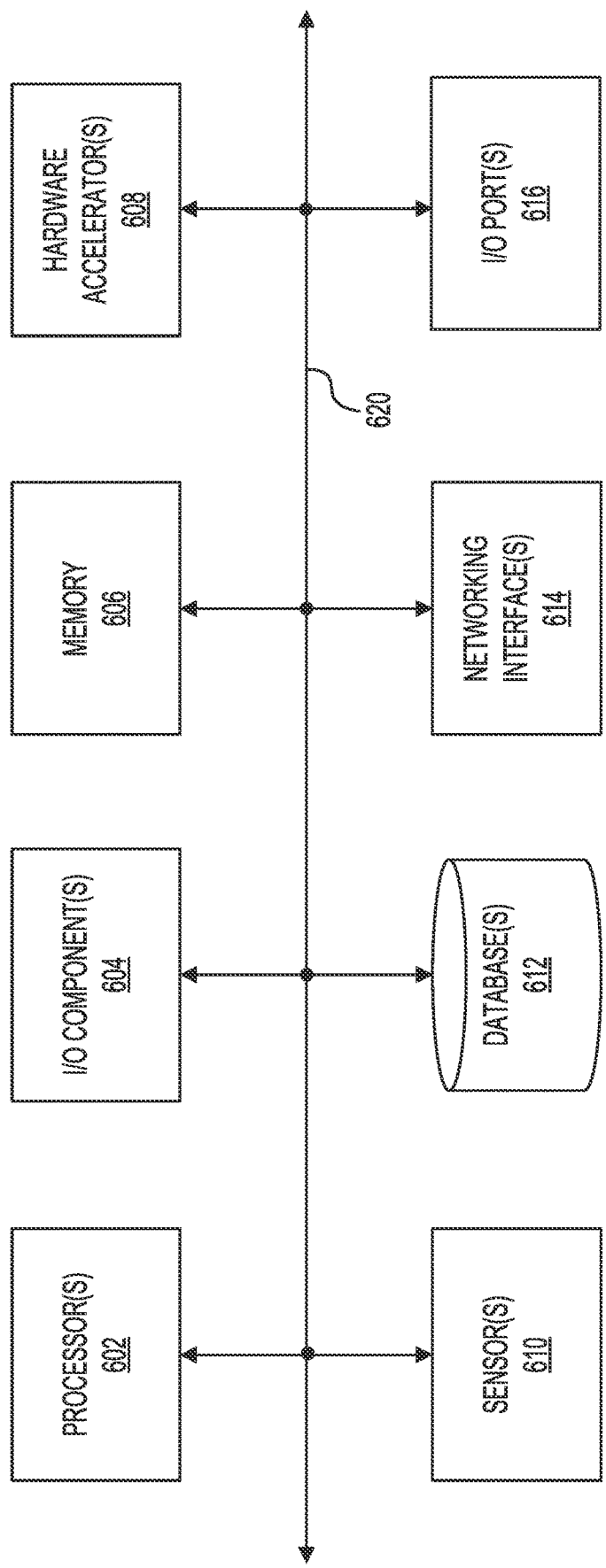
FIG. 6 shows a computing platform that may be used for performing certain methods in accordance with one example.

FIG. 6 shows a block diagram of a computing platform 600 (e.g., for implementing certain aspects of the methods and algorithms associated with the present disclosure) in accordance with one example. Computing platform 600 may include a processor(s) 602, I/O component(s) 604, memory 606, hardware accelerator(s) 608, sensor(s) 610, database(s) 612, networking interface(s) 614 and I/O Port(s), which may be interconnected via bus 620. Processor(s) 602 may execute instructions stored in memory 606. I/O component (s) 604 may include user interface devices such as a keyboard, a mouse, a voice recognition processor, touch screens, or displays. Memory 606 may be any combination of non-volatile storage or volatile storage (e.g., flash memory, DRAM, SRAM, or other types of memories). Hardware accelerator(s) 608 may include any of the hardware accelerators described earlier.

Sensor(s) 610 may include telemetry or other types of sensors configured to detect, and/or receive, information (e.g., conditions associated with the devices). Sensor(s) 610 may include sensors configured to sense conditions associated with CPUs, memory or other storage components, FPGAS, motherboards, baseboard management controllers, or the like. Database(s) 612 may be used to store data used for generating reports related to execution of the workloads using cores associated with processor(s) 602 or hardware accelerator(s) 608.

Networking interface(s) 614 may include communication interfaces, such as Ethernet, cellular radio, Bluetooth radio, UWB radio, or other types of wireless or wired communication interfaces. I/O port(s) may include Ethernet ports, InfiniBand ports, Fiber Optic port(s), or other types of ports. Although FIG. 6 shows computing platform 600 as including a certain number of components arranged and coupled in a certain way, it may include fewer or additional components arranged and coupled differently. In addition, the functionality associated with computing platform 600 may be distributed, as needed.

Figure 7:
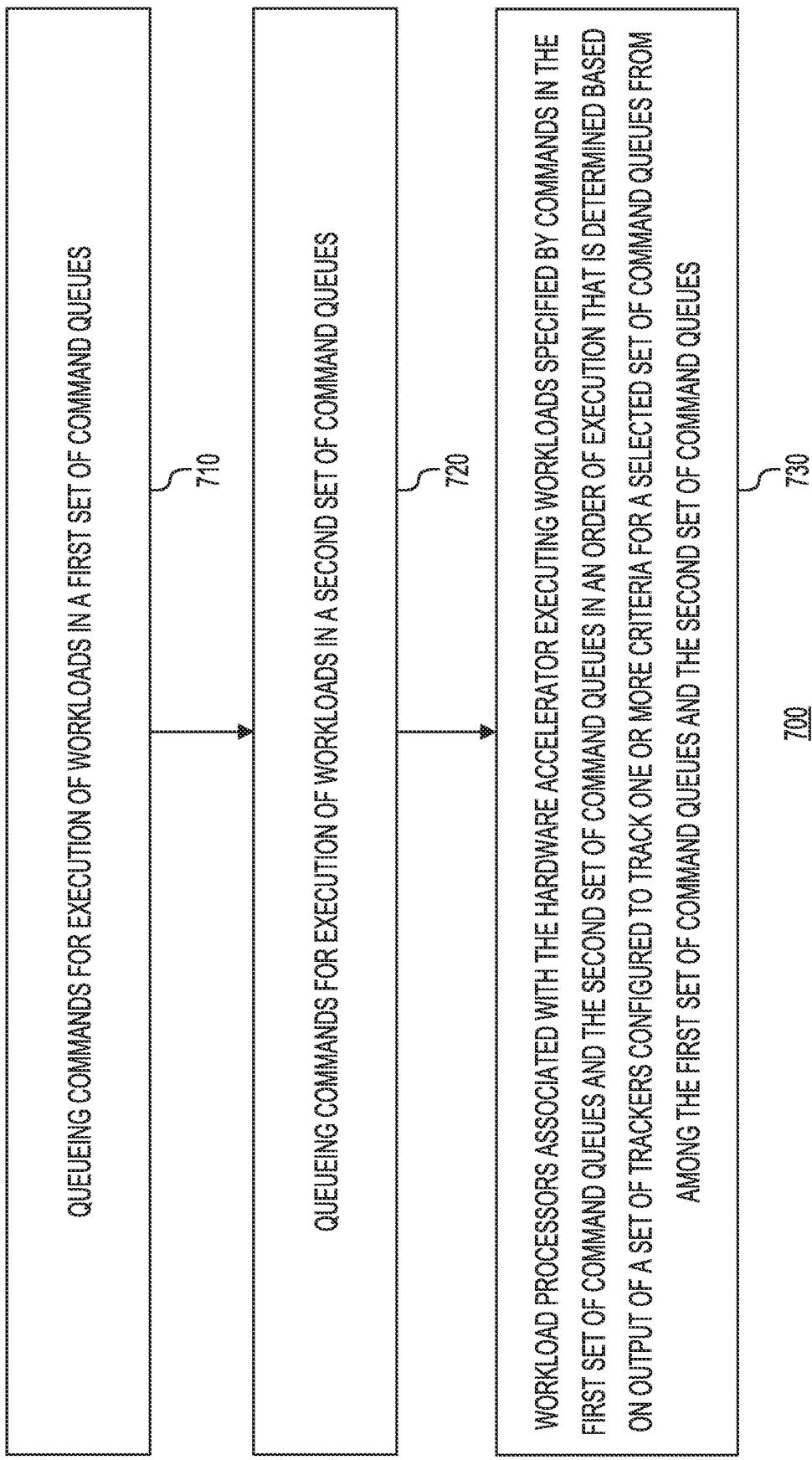
FIG. 7 shows a flowchart of a method in accordance with one example.

FIG. 7 shows a flowchart 700 of a method in accordance with one example. This method relates to operating a hardware accelerator configured to process commands submitted by client applications directly to the hardware accelerator, where a workload corresponding to a command can be executed either by a compute core accessible to a client application or by the hardware accelerator. In one example, this method may be performed using one or more components associated with system 100 of FIG. 1. Any of the client applications 102, 104, or 106 may submit the command for execution of the workload directly (e.g., via path 174 of FIG. 1) to any of the hardware accelerators (e.g., accelerator 1

170, accelerator 2 180, or accelerator M 190 of FIG. 1). Step 710 may include queueing commands for execution of workloads in a first set of command queues. As an example, a subset of command queues 220 of FIG. 2 may correspond to the physical functions. PF command queues 420 of FIG. 4 is another example of commands that have been queued by the hardware accelerator.

Step 720 may include queueing commands for execution of workloads in a second set of command queues. As an example, a subset of command queues 220 of FIG. 2 may correspond to the virtual functions. VF command queues 410 of FIG. 4 is another example of commands that have been queued by the hardware accelerator.

Step 730 may include workload processors associated with the hardware accelerator executing workloads specified by the commands in the first set of command queues and the second set of command queues in an order of execution that is determined based on output of a set of trackers configured to track one or more criteria for a selected set of command queues from among the first set of command queues and the second set of command queues. Any of the workload processors shown in FIG. 2 may execute the workloads specified by the commands. As explained earlier, the trackers configured to track various criteria based on the quality of service parameters (e.g., based on the principles specified in Table 1 earlier) can provide the outputs. In one example, the order of execution is determined based on a two-stage arbitration process that can take into account the output from the set of trackers. For the first and second stages of arbitration, there are three priority levels to use for a given queue/function including: (1) one priority level is to be used when a queue/function minimum performance tracker indicates that the aggregate performance of all commands from a queue/function is falling behind a desired rate (usually assigned a higher priority number), (2) another priority level is to be used when a queue/function maximum performance tracker indicates that the queue/function performance is ahead of the maximum performance rate, and (3) yet another priority level is to be used if neither case is true.

Figure 8:
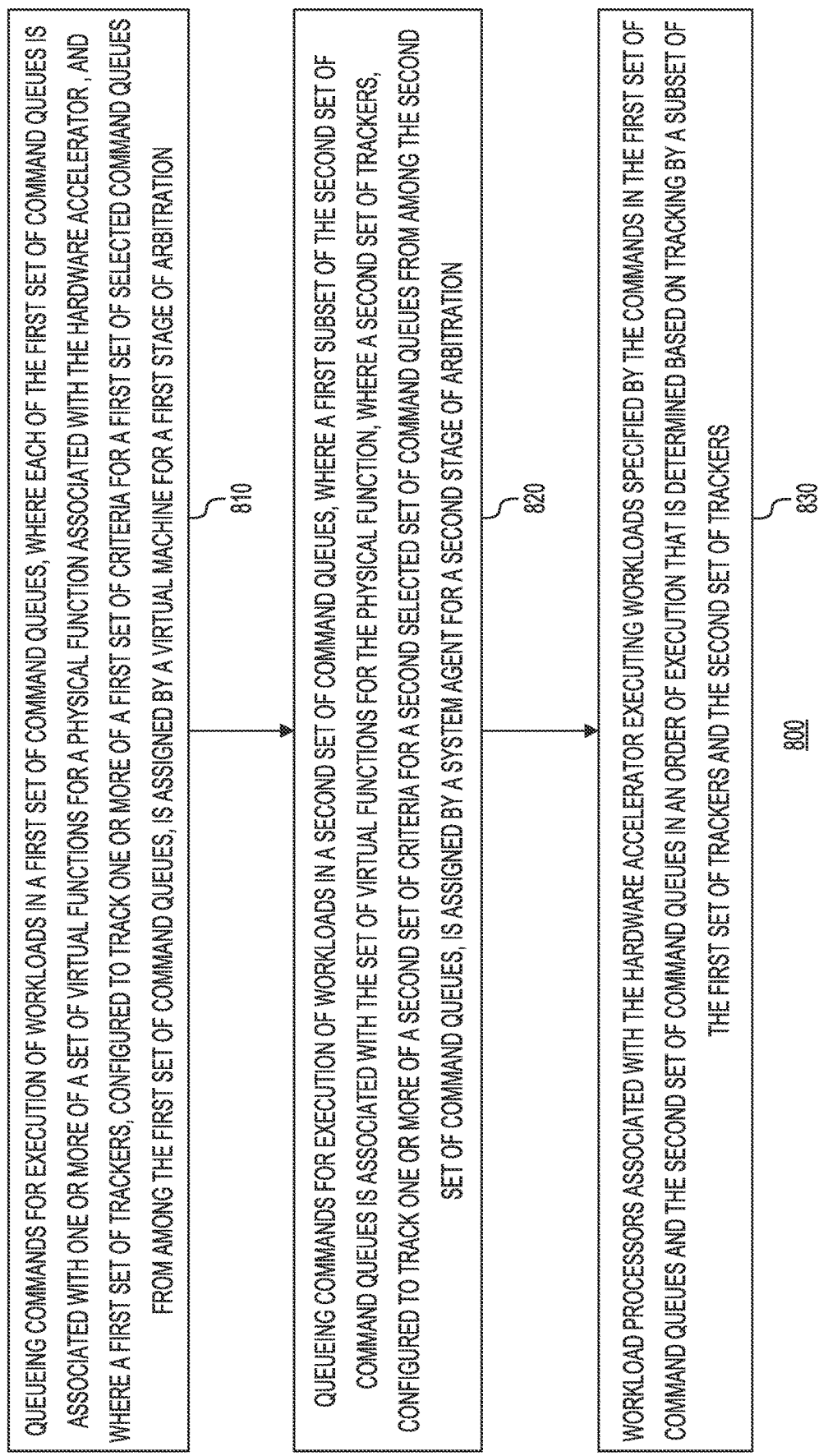
FIG. 8 shows another flowchart of a method in accordance with one example.

FIG. 8 shows a flowchart 800 of a method in accordance with one example. This method relates to operating a hardware accelerator configured to process commands submitted by client applications directly to the hardware accelerator, where a workload corresponding to a command can be executed either by a compute core accessible to a client application or by the hardware accelerator. In one example, this method may be performed using one or more components associated with system 100 of FIG. 1. Any of the client applications 102, 104, or 106 may submit the command for execution of the workload directly (e.g., via path 174 of FIG. 1) to any of the hardware accelerators (e.g., accelerator 1 170, accelerator 2 180, or accelerator N 190 of FIG. 1). Step 810 may include queueing commands for execution of workloads in a first set of command queues, where each of the first set of command queues is associated with one or more of a set of virtual functions for a physical function associated with the hardware accelerator, and where a first set of trackers, configured to track one or more a first set of criteria for a first selected set of command queues from among the first set of command queues, is assigned by a virtual machine for a first stage of arbitration. As an example, a subset of command queues 220 of FIG. 2 may correspond to the physical functions. PF command queues 420 of FIG. 4 is another example of commands that have been queued by the hardware accelerator. In one example, the virtual functions (VFs) can be assigned to virtual machines (VMs) as needed for the virtual machines to perform work. The QoS mechanisms attempt to ensure that no one VF can corner all of the accelerator resources for itself, and to support different classes of service. So, in this example, the first stage of arbitration is purely under the control of the function driver (e.g., the VF driver) to allocate resources and performance amongst the queues in a VF. If the function driver wants to assign all its queues the highest priority, it can, but that is only used for the first stage of arbitration. This ensures that the function driver can cause issues for itself only if it uses improper settings.

Step 820 may include queueing commands for execution of workloads in a second set of command queues, where a first subset of the second set of command queues is associated with the set of virtual functions for the physical function, where a second set of trackers, configured to track one or more of a second set of criteria for a second selected set of command queues from among the second set of command queues, is assigned by a system agent for a second stage of arbitration. As an example, a subset of command queues 220 of FIG. 2 may correspond to the virtual functions. VF command queues 410 of FIG. 4 is another example of commands that have been queued by the hardware accelerator. The second stage of arbitration (used to select which function gets access next) has its QoS settings entirely under the control of the device driver (e.g., the PF driver). This way, the device driver can ensure that clients have fair access to the accelerator performance, such that the function driver (e.g., VF driver) cannot have unfair access to the accelerator performance by using settings to the detriment of other clients or client applications.

In this example, the physical function is predominantly for use by the system tasks, which are workloads that are likely to stay on the system on chip (SoC) with the attached memory. VFs on the other hand can be migrated to other SoCs as part of a cloud server load balancing effort. In this example, it is presumed that the system software offloading tasks to the physical function can have workloads that take higher priority over all client workloads, workloads that take lower priority over all client workloads, and workloads that can be run with the same priority as client workloads. For these reasons, the first stage and the second stage priority levels for each queue for the physical function can be independently selected. Also, in this example, instead of tracking the physical function workloads, the tracking of the client workloads is allowed to adjust the priorities relative to the "static" physical function workload priorities.

As an example, assuming the physical function has 3 queues in the PF portal. As described above, one queue is for the workloads with a higher priority than all workloads for the client applications, one queue is for workloads with lower priority than all workloads for the client applications, and one queue is for workloads to be executed in a round robin fashion with workloads for the client applications. Furthermore, assume a system agent (e.g., a device driver) has enabled trackers for tracking the minimum performance and maximum performance at the VF level. In this example, the suggested second stage priority levels may be: PF High Priority Queue (Level 15), PF Normal Priority Queue (Level 8), PF Low Priority Queue (Level 1), VF Falling Behind Priority (e.g., if minimum tracker fired) (Level 12), VF Exceeded Maximum (maximum tracker fired) (Level 0) (zero value means perform no work until level is changed (a hard limit mechanism)), and VF Normal Priority (Level 8).

Step 830 may include workload processors associated with the hardware accelerator executing workloads specified by the commands in the first set of command queues and the second set of command queues in an order of execution that is determined based on tracking by a subset of the first set of trackers and the second set of trackers. Any of the workload processors shown in FIG. 2 may execute the workloads specified by the commands. As explained earlier, the trackers configured to track various criteria based on the quality of service parameters (e.g., based on the principles specified in Table 1 earlier) can provide the outputs. In one example, the order of execution is determined based on a two-stage arbitration process that can take into account the output from the respective set of trackers. For the first and second stages of arbitration, there are three priority levels to use for a given queue/function including: (1) one priority level is to be used when a queue/function minimum performance tracker indicates that the aggregate performance of all commands from a queue/function is falling behind a desired rate (usually assigned a higher priority number), (2) another priority level is to be used when a queue/function maximum performance tracker indicates that the queue/function performance is ahead of the maximum performance rate, and (3) yet another priority level is to be used if neither case is true.

In conclusion, the present disclosure relates to a method for operating a hardware accelerator configured to process commands submitted by client applications directly to the hardware accelerator, where a workload corresponding to a command can be executed either by a compute core accessible to a client application or by the hardware accelerator. The method may include queueing commands for execution of workloads in a first set of command queues.

The method may further include queueing commands for execution of workloads in a second set of command queues. The method may further include workload processors associated with the hardware accelerator executing workloads specified by the commands in the first set of command queues and the second set of command queues in an order of execution that is determined based on output of a set of trackers configured to track one or more criteria for a selected set of command queues from among the first set of command queues and the second set of command queues.

The first subset of the selected set of command queues may have adjustable priorities and a second subset of the selected set of command queues may have fixed priorities. The method may further include adjusting priorities associated with the first subset of the selected set of command queues based on the output of one or more of the set of trackers.

As part of the method, an output from a separate tracker from among a first subset of the set of trackers for each of a subset of the selected command queues is used for arbitration at a first stage of arbitration. A separate tracker from among a second subset of the set of trackers for each of virtual functions, or a group of virtual functions, for a physical function associated with the hardware accelerator is used for arbitration at a second stage of arbitration.

An output from a separate tracker from among the set of trackers for the hardware accelerator is used for management of workloads at a system of chip level. The one or more criteria includes at least one of: (1) absolute usage or relative usage of a resource by one or more command queues from among the selected set of command queues, (2) minimum performance of execution of commands from among the selected set of command queues, or (3) absolute usage or relative usage of the hardware accelerator by the selected set of command queues.

In yet another aspect, the present disclosure relates to a system including an accelerator portal to allow a plurality of client applications access to one or more of a plurality of shared hardware accelerators, where each of the plurality of client applications can execute a workload using a compute core or by using one of the plurality of shared hardware accelerators. The system may further include a hardware accelerator, from among the plurality of shared hardware accelerators, configured to queue commands for execution of workloads in a first set of command queues.

The hardware accelerator is further configured to queue commands for execution of workloads in a second set of command queues. The system may further include workload processors, associated with the hardware accelerator, configured to execute workloads specified by the commands in the first set of command queues and the second set of command queues in an order of execution that is determined based on output of a set of trackers configured to track one or more criteria for a selected set of command queues from among the first set of command queues and the second set of command queues.

The first subset of the selected set of command queues may have adjustable priorities and a second subset of the selected set of command queues may have fixed priorities. The system is further configured to allow adjusting of priorities associated with the first subset of the selected set of command queues based on the output of one or more of the set of trackers.

An output from a separate tracker from among a first subset of the set of trackers for each of a subset of the selected command queues is used for arbitration at a first stage of arbitration. A separate tracker from among a second subset of the set of trackers for each of virtual functions, or a group of virtual functions, for a physical function associated with the hardware accelerator is used for arbitration at a second stage of arbitration.

An output from a separate tracker from among the set of trackers for the hardware accelerator is used for management of workloads at a system of chip level. The one or more criteria includes at least one of: (1) absolute usage or relative usage of a resource by one or more command queues from among the selected set of command queues, (2) minimum performance of execution of commands from among the selected set of command queues, or (3) absolute usage or relative usage of the hardware accelerator by the selected set of command queues.

In another aspect, the present disclosure relates to a method for operating a hardware accelerator configured to process commands submitted by client applications directly to the hardware accelerator, where a workload corresponding to a command can be executed either by a compute core accessible to a client application or by the hardware accelerator. The method may include queueing commands for execution of workloads in a first set of command queues, where each of the first set of command queues is associated with one of a set of virtual functions for a physical function associated with the hardware accelerator, and wherein a first set of trackers, configured to track one or more a first set of criteria for a first selected set of command queues from among the first set of command queues, is assigned by a virtual machine for a first stage of arbitration.

The method may further include queueing commands for execution of workloads in a second set of command queues, where a first subset of the second set of command queues is associated with the set of virtual functions for the physical function, where a second set of trackers, configured to track one or more of a second set of criteria for a second selected set of command queues from among the second set of command queues, is assigned by a system agent for a second stage of arbitration.

The method may further include workload processors associated with the hardware accelerator executing workloads specified by the commands in the first set of command queues and the second set of command queues in an order of execution that is determined based on tracking by a subset of the first set of trackers and the second set of trackers.

The first subset of the second selected set of command queues may have adjustable priorities and a second subset of the second selected set of command queues may have fixed priorities. The method may further include adjusting priorities associated with the first subset of the second selected set of command queues based on output of one or more of the second set of trackers. As part of the method, the first set of criteria comprises one of absolute usage of a resource or relative usage of a resource by a queue from among the first selected set of command queues.

In addition, as part of the method, the second set of criteria comprises one of maximum aggregate usage of a resource or a maximum relative usage of a resource by a virtual function from among the second selected set of command queues. The first set of trackers is for tracking criteria for arbitration during a first stage of the arbitration and the second set of trackers is for tracking criteria for arbitration during a second stage of the arbitration, and the order of execution is determined based on the first stage of the arbitration and the second stage of the arbitration.

It is to be understood that the methods, modules, and components depicted herein are merely exemplary. Alternatively, or in addition, the functionality described herein can be performed, at least in part, by one or more hardware logic components. For example, and without limitation, illustrative types of hardware logic components that can be used include Field-Programmable Gate Arrays (FPGAs), Application-Specific Integrated Circuits (ASICs), Application-Specific Standard Products (ASSPs), System-on-a-Chip systems (SOCs), Complex Programmable Logic Devices (CPLDs), etc. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or inter-medial components. Likewise, any two components so associated can also be viewed as being "operably connected," or "coupled," to each other to achieve the desired functionality.

The functionality associated with some examples described in this disclosure can also include instructions stored in a non-transitory media. The term "non-transitory media" as used herein refers to any media storing data and/or instructions that cause a machine to operate in a specific manner. Exemplary non-transitory media include non-volatile media and/or volatile media. Non-volatile media include, for example, a hard disk, a solid state drive, a magnetic disk or tape, an optical disk or tape, a flash memory, an EPROM, NVRAM, PRAM, or other such media, or networked versions of such media. Volatile media include, for example, dynamic memory such as DRAM, SRAM, a cache, or other such media. Non-transitory media is distinct from but can be used in conjunction with transmission media. Transmission media is used for transferring data and/or instruction to or from a machine. Exemplary transmission media include coaxial cables, fiber-optic cables, copper wires, and wireless media, such as radio waves.

Furthermore, those skilled in the art will recognize that boundaries between the functionality of the above described operations are merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Although the disclosure provides specific examples, various modifications and changes can be made without departing from the scope of the disclosure as set forth in the claims below. Accordingly, the specification and figures are to be regarded in an illustrative rather than a restrictive sense, and all such modifications are intended to be included within the scope of the present disclosure. Any benefits, advantages, or solutions to problems that are described herein with regard to a specific example are not intended to be construed as a critical, required, or essential feature or element of any or all the claims.

Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

Unless stated otherwise, terms such as "first" and "second" are used to arbitrarily distinguish between the elements such terms describe. Thus, these terms are not necessarily intended to indicate temporal or other prioritization of such elements.

What is claimed:

1. A method for operating a hardware accelerator configured to process commands submitted by client applications directly to the hardware accelerator, wherein a workload corresponding to a command can be executed either by a compute core accessible to a client application or by the hardware accelerator, the method comprising:
    queueing commands for execution of workloads in a first set of command queues;
    queueing commands for execution of workloads in a second set of command queues; and
    workload processors associated with the hardware accelerator executing workloads specified by commands in the first set of command queues and the second set of command queues in an order of execution that is determined based on output of a set of trackers configured to track one or more criteria for a selected set of command queues from among the first set of command queues and the second set of command queues.

2. The method of claim 1, wherein a first subset of the selected set of command queues has adjustable priorities and wherein a second subset of the selected set of command queues has fixed priorities.

3. The method of claim 2, further comprising adjusting priorities associated with the first subset of the selected set of command queues based on the output of one or more of the set of trackers.

4. The method of claim 1, wherein an output from a separate tracker from among a first subset of the set of trackers for each of a subset of the selected command queues is used for arbitration at a first stage of arbitration.

5. The method of claim 4, wherein a separate tracker from among a second subset of the set of trackers for each of virtual functions, or a group of virtual functions, for a physical function associated with the hardware accelerator is used for arbitration at a second stage of arbitration.

6. The method of claim 5, wherein an output from a separate tracker from among the set of trackers for the hardware accelerator is used for management of workloads at a system of chip level.

7. The method of claim 1, wherein the one or more criteria comprises at least one of: (1) absolute usage or relative usage of a resource by one or more command queues from among the selected set of command queues, (2) minimum performance of execution of commands from among the selected set of command queues, or (3) absolute usage or relative usage of the hardware accelerator by the selected set of command queues.

8. A system comprising:
an accelerator portal to allow a plurality of client applications access to one or more of a plurality of shared hardware accelerators, wherein each of the plurality of client applications can execute a workload using a compute core or by using one of the plurality of shared hardware accelerators;
a hardware accelerator, from among the plurality of shared hardware accelerators, configured to queue commands for execution of workloads in a first set of command queues;
the hardware accelerator further configured to queue commands for execution of workloads in a second set of command queues; and
workload processors, associated with the hardware accelerator, configured to execute workloads specified by the commands in the first set of command queues and the second set of command queues in an order of execution that is determined based on output of a set of trackers configured to track one or more criteria for a selected set of command queues from among the first set of command queues and the second set of command queues.

9. The system of claim 8, wherein a first subset of the selected set of command queues has adjustable priorities and wherein a second subset of the selected set of command queues has fixed priorities.

10. The system of claim 9, wherein the system is further configured to allow adjusting of priorities associated with the first subset of the selected set of command queues based on the output of one or more of the set of trackers.

11. The system of claim 8, wherein an output from a separate tracker from among a first subset of the set of trackers for each of a subset of the selected command queues is used for arbitration at a first stage of arbitration.

12. The system of claim 11, wherein a separate tracker from among a second subset of the set of trackers for each of virtual functions, or a group of virtual functions, for a physical function associated with the hardware accelerator is used for arbitration at a second stage of arbitration.

13. The system of claim 12, wherein an output from a separate tracker from among the set of trackers for the hardware accelerator is used for management of workloads at a system of chip level.

14. The system of claim 8, wherein the one or more criteria comprises at least one of: (1) absolute usage or relative usage of a resource by one or more command queues from among the selected set of command queues, (2) minimum performance of execution of commands from among the selected set of command queues, or (3) absolute usage or relative usage of the hardware accelerator by the selected set of command queues.

15. A method for operating a hardware accelerator configured to process commands submitted by client applications directly to the hardware accelerator, wherein a workload corresponding to a command can be executed either by a compute core accessible to a client application or by the hardware accelerator, the method comprising:
queueing commands for execution of workloads in a first set of command queues, wherein each of the first set of command queues is associated with one or more of a set of virtual functions for a physical function associated with the hardware accelerator, and wherein a first set of trackers, configured to track one or more a first set of criteria for a first selected set of command queues from among the first set of command queues, is assigned by a virtual machine for a first stage of arbitration;
queueing commands for execution of workloads in a second set of command queues, wherein a first subset of the second set of command queues is associated with the set of virtual functions for the physical function, wherein a second set of trackers, configured to track one or more of a second set of criteria for a second selected set of command queues from among the second set of command queues, is assigned by a system agent for a second stage of arbitration; and
workload processors associated with the hardware accelerator executing workloads specified by commands in the first set of command queues and the second set of command queues in an order of execution that is determined based on tracking by a subset of the first set of trackers and the second set of trackers.

16. The method of claim 15, wherein a first subset of the second selected set of command queues has adjustable priorities and wherein a second subset of the second selected set of command queues has fixed priorities.

17. The method of claim 16, further comprising adjusting priorities associated with the first subset of the second selected set of command queues based on output of one or more of the second set of trackers.

18. The method of claim 15, wherein the first set of criteria comprises absolute usage of a resource or relative usage of a resource by a queue from among the first selected set of command queues.

19. The method of claim 16, wherein the second set of criteria comprises maximum aggregate usage of a resource or a maximum relative usage of a resource by a virtual function from among the second selected set of command queues.

20. The method of claim 15, wherein the first set of trackers is for tracking criteria for arbitration during a first stage of the arbitration and the second set of trackers is for tracking criteria for arbitration during a second stage of the arbitration, and wherein the order of execution is determined based on the first stage of the arbitration and the second stage of the arbitration.

* * * * *